United States Patent
Foltuz et al.

[11] Patent Number: 6,146,127
[45] Date of Patent: Nov. 14, 2000

[54] BAFFLE SORTING SYSTEM FOR INJECTION MOLDING MACHINES

[75] Inventors: Eugene L. Foltuz; Norman H. Cohan; Enidio A. Gomez, all of Miami Lakes, Fla.

[73] Assignee: Security Plastics, Inc., Miami Lakes, Fla.

[21] Appl. No.: 09/223,857

[22] Filed: Dec. 31, 1998

[51] Int. Cl.⁷ .................................................. B29C 45/40
[52] U.S. Cl. ............................ 425/556; 264/334; 425/572
[58] Field of Search ..................................... 425/556, 554, 425/139, 165, 572; 264/334

[56] References Cited

U.S. PATENT DOCUMENTS

| | | |
|---|---|---|
| 3,986,811 | 10/1976 | Gunnels, Jr. . |
| 4,118,168 | 10/1978 | Rees et al. . |
| 4,608,008 | 8/1986 | Hehl . |
| 4,719,059 | 1/1988 | Braun et al. . |
| 4,741,687 | 5/1988 | Eltvedt . |
| 4,892,472 | 1/1990 | Harrison . |
| 4,901,503 | 2/1990 | Gomez et al. . |
| 4,946,357 | 8/1990 | Harrison . |
| 5,439,634 | 8/1995 | North . |

*Primary Examiner*—Tim Heitbrink
*Attorney, Agent, or Firm*—Lott & Friedland, PA

[57] ABSTRACT

A baffle sorting system for use with injection mold machines that produce different mold products from a plurality of mold cavities during the same production run whereby at least one baffle extends perpendicular to one plate in a mold between two mold cavities, and corresponding slot on the second plate of a mold receives the baffle when both plates are coupled. When the product is ready to be ejected from the machine, both plates separate, but the baffle prevents the products of one mold from intermingling with the products of a second mold. The products drop down into a collection device for further processing or packaging. Alternatively, the baffles are positioned between the A plate and the B plate during the ejection phase of the molding cycle, then retracted from the mold machine during the injection phase.

10 Claims, 2 Drawing Sheets

BAFFLE SORTING SYSTEM FOR INJECTION MOLDING MACHINES

FIELD OF INVENTION

The present invention relates to an apparatus for receiving of a plurality of plastic parts from an injection mold machine and automatically sorting the parts for packaging and/or further processing.

BACKGROUND OF THE INVENTION

The use of multi-cavity molds such as those used in polymer injection molding machines is well known. Such machines utilize heated, liquefied plastic forced through each of the cavities in a mold until the cavities are filled. The liquefied plastic flows through conduits called runners that interconnect a plurality of parts within the mold. The plastic is then cooled to solidify and the remaining part and runner array is then ejected from the machine. In a preferred system, the part and runner are separated from each other automatically.

One problem existing in the industry is the separation of various parts in a multi-cavity mold system. While the same part may be produced from identical molds in a multi-cavity mold system, a heterocavity system utilizes a variety of different molds and a plurality of different products are ejected from the machine concurrently. Furthermore, it is often difficult to separate the differing mold products once they have been ejected.

Additionally, even if the same mold product is ejected from a plurality of cavities, it is desirable for quality control purposes to associate the mold output with a specific mold cavity in the event a defect in one or more of the cavities is discovered.

One method of separating and delivering mold parts, whether they are plastic or composed of other materials, is the use of compressed air to effectively propel the parts from their point of ejection to their point of collection. U.S. Pat. No. 3,163,470 to Brewin et al describes a pneumatic system to propel lightweight materials, such as hosiery, through a plurality of independent and separate channels to their intended location. The structure in this patent is not directed to receiving, stripping, ejection or other process for the separation of plastic parts from a runner assembly.

U.S. Pat. No. 3,986,811 to Gunnels, Jr. describes a molding apparatus with receiving chute device arranged below opposing plates of a mold machine whereby the molded product drops from the machine when the plates separate and means are provided to deflect the product and transport it for further processing.

U.S. Pat. No. 4,118,168 to Ress et al. describes a guidance system for substantially flat mold products discharged from a mold cavity whereby upon ejection from the mold plates, the products fall into a vertical channel maintaining a predetermined orientation for optimal collection and/or processing.

U.S. Pat. No. 4,608,008 to Hehl describes a compact parts discharge conveyor adapted for injection molding machines whereby mold products discharged from the molding machine fall from the plates onto a conveyor means comprising an endless conveyor belt rotatably mounted within a chassis, the chassis including a core disposed between the upper and lower belt runs of the conveyor belt. Two side walls secured to the longitudinal sides of the core retain the mold products traveling on the belt.

U.S. Pat. No. 4,719,059 to Braun et al. describes a material handling device whereby mold products ejected from an injection mold machine fall into a basket on rails which then moves on the rails to a location away from the mold for further processing.

U.S. Pat. No. 4,741,687 to Eltvedt describes a guide skirt for guiding parts ejected from an injection mold to a receptacle whereby the sides of the skirt are pivotably connected together so that the bottom outlet port also opens and closes as the mold plates move back and forth between open and closed positions.

U.S. Pat. No. 4,946,357 to Harrison describes a diverter chute assembly to automatically separate the molded part from the runner in injection mold machines. The assembly comprises a deflection plate pivotally mounted within a housing and responsive to control signals synchronized with the ejection of the mold product and the runner whereby the product is directed to a first collection area and the runner is directed to a second collection area.

U.S. Pat. No. 5,439,634 to North describes a method and device for separating runners and sprues from parts as they are ejected from an injection mold machine comprising a product receiver underlying the injection molds for receiving the product after the molds have been opened whereby An apparatus described in U.S. Pat. No. 4,901,503 to Gomez et al. provides an assembly for the receiving of a plurality of interconnected plastic parts from a plastic mold through the provision of a collector means moveably mounted to travel on a base. The collector means includes a plurality of chambers proportional in number to the number of plastic parts being ejected from the mold such that each part of a given array of parts is received in an independent chamber. A plurality of individual tubes connect each independent chamber to a delivery point for the mold products. Compressed air is used to force the products through the individual tubes.

None of the systems described above provide a sorting mechanism that keeps different molded parts in the same mold from intermixing during a free fall into a collector. Furthermore, there is a need in the art for a faster and more efficient sorting mechanism for heterocavity mold systems that do not require robotics to collect the mold products from the machine for further processing.

SUMMARY OF THE INVENTION

The present invention solves significant problems in the art by providing a baffle sorting system which prevents a combination of different mold products from mixing during the ejection of the products. When the parts are ejected from the mold machine, the baffles keep them separate from adjoining mold output. The parts drop out of the mold and into the appropriate container. As an alternative, the parts may fall into a divided conveyor belt to transport them to another location for further processing.

The system comprises an injection mold having an A plate and an opposing B plate wherein a plurality of mold cavities are formed in both plates. At least one baffle is rigidly fixed to and extends perpendicular to the A plate. The baffle is positioned between the mold cavities. On the opposing B plate, at least one slot is fashioned to slideably receive the baffle when the A plate and the B plate are pressed together. When the A plate and the B plate are pressed together during the injection phase, the baffle is completely received within the slot in the B plate. Once the injection material within the molds is solidified, the A plate and the B plate separate wherein the baffle is withdrawn from the opposing slot in the B plate. The parts are then simultaneously ejected from a plurality of mold cavities and the baffle prevents the parts from one cavity from mixing with the parts of a second cavity. The parts fall by force of gravity downward to a suitable collection apparatus.

To facilitate the proper alignment of both A and B plates, one or more guide pins may extend perpendicular to the A plate and are slideably received by one or more corresponding apertures in the B plate when both plates are pressed together. A plurality of collection tubes opening under the mold may be positioned whereby the mold products falling from an individual mold cavity are received by the corresponding tube and transported to another location. In another embodiment, a conveyor belt having a plurality of separated, side-walled tracks collects the mold products falling from individual mold cavities which are received within the side-walled track of the conveyor belt and transported to another location. In still another embodiment, the mold products and runner arrays produced during the injection mold process are of substantially different dimensions to permit separation by moving both the mold products and the runner arrays over an aperture to allow the smaller object to fall through while the larger object is retained above the aperture.

In an alternative embodiment, the baffles are fixed to a robotic arm wherein the baffles are retracted from the apparatus during the injection phase and inserted between the plates during the ejection phase. The moveable baffle configuration forgoes the need to fashion slots on the B plate to accept the full length of the A plate baffles during compression of the two plates. The configuration also permits the two plates to be further retracted apart during the ejection phase which permits better visibility of the process by human or electronic means and also permits easier access to the molds for changing and maintenance.

It is an object of the present invention to provide an improved sorting mechanism for heterocavity mold injection systems. An advantage of the fixed-baffle embodiment is that the baffles forgo the need for robotics to collect products from the separate mold cavities. In addition, the baffle system permits a shorter production cycle as the parts immediately fall into the appropriate collection device and are not collected by robotic means.

An advantage of the robotic-baffle embodiment is that the deep slots are not required in the B plate and that the A plate and B plate may be separated by a greater distance during the ejection process. This permits easier monitoring and accessibility for mold changing and maintenance.

These and other objects, features, and advantages of the present invention may be more clearly understood and appreciated from a review of the following detailed description of the disclosed embodiments and by reference to the appended drawings and claims.

DETAILED DESCRIPTION OF THE PREFERRED EMBODIMENT

Figure 1:
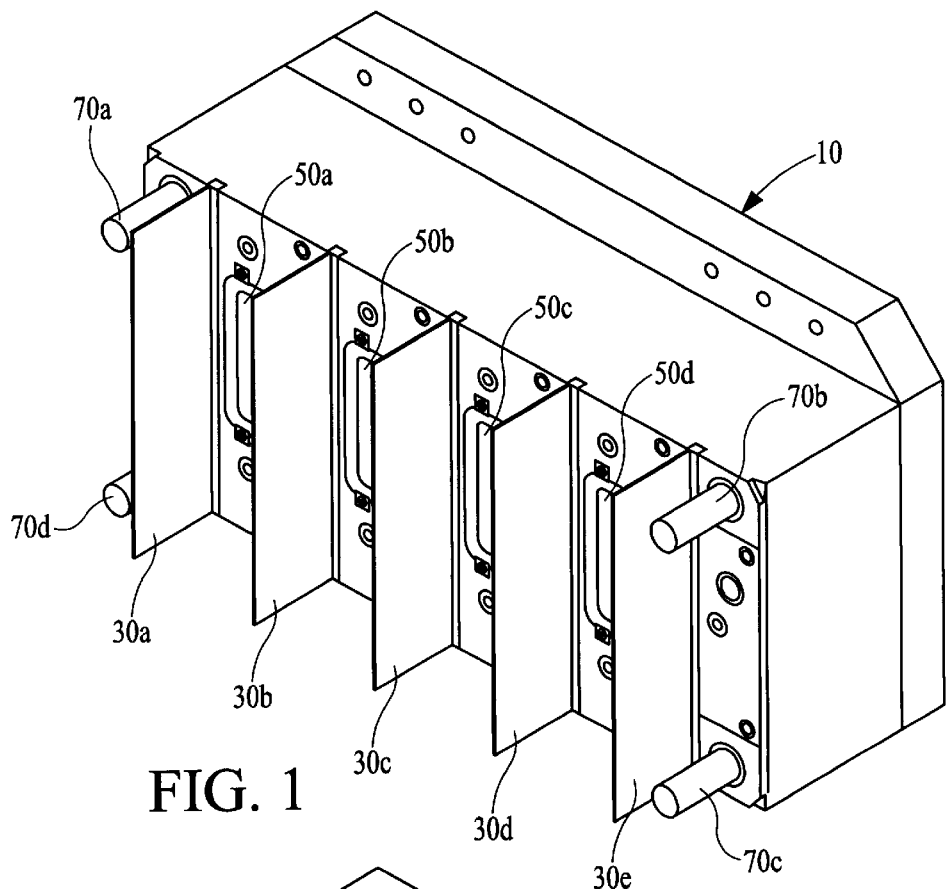
FIG. 1 is a perspective view of an embodiment of the A plate of the mold according to the invention.
Figure 2:
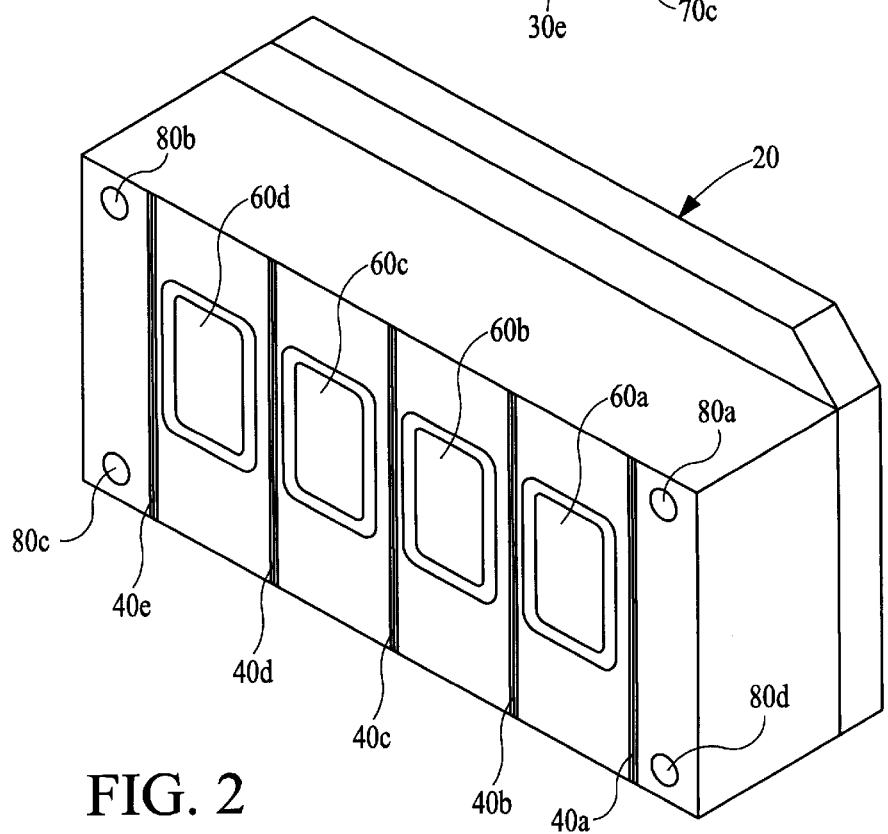
FIG. 2 is a perspective view of an embodiment of the B plate of the mold according to the invention.

Referring to FIGS. 1 and 2 of the drawings, in which like numerals indicate like elements throughout the several views, in a preferred embodiment of the baffle sorting system an A plate 10 comprises a plurality of A-side mold cavities 50a–d separated by a plurality of baffles 30a–e extending perpendicular to a A plate face 90.

A B plate 20 comprises a plurality of B-side mold cavities 60a–d formed within a B plate face 100, which when placed over the corresponding A-side mold cavities 50a–d, material is injected, typically heated thermoplastic resin which is then cooled to solidify. While the A plate 10 and the B plate 20 are in a closed position, the baffles 30a–e are slideably received by corresponding slots 40a–e on the B plate 20. To enhance the operation of opening and closing both plates together, a plurality of guide pins 70a–d extend perpendicular from the A plate face 90, preferably on the four corners of the A plate 10. The guide pins 70a–d are slideably received by corresponding receiving apertures 80a–d on the B plate face 100. In a preferred embodiment, the guide pins and receiving apertures are of a tapered, annular design to facilitate the repeated opening and closing of the mold.

When the A plate 10 and the B plate 20 are separated in an open position, the baffles 30a–e provide a barrier between the adjacent mold cavities 50a–d and 60a–d from each other. Mold products are then ejected from the mold cavities and fall by force of gravity into a collection bin [not shown] below the mold. During the ejection, the baffles 30a–e prevent the ejected mold products from intermingling from each other. The collection bin may comprise a simple container, a conveyer belt, a tube or similar structure to transport the mold products to other location for packaging or further processing.

If runner arrays are ejected with the mold products, the transport mechanism may move both the mold products and the runner arrays over an aperture to allow the smaller object, usually the mold product, to fall through while the larger object, usually the runner array, is retained above the aperture. This transport mechanism may be achieved by sliding the mold products and runner arrays down a chute with an aperture on the bottom, by transporting the mold products and runner arrays by conveyor belt over an aperture, or by any similar sorting mechanism. As an alternative, the runner array may be ejected sequentially to the mold products, either before or after the mold products are ejected. By utilizing a sequential ejection mechanism, means may be provided to catch the runner arrays so they do not intermix with the mold products. Systems that do not product runners at all, such as hot manifold systems, are well known in the art and would serve to obviate such separation concerns.

Figure 3:
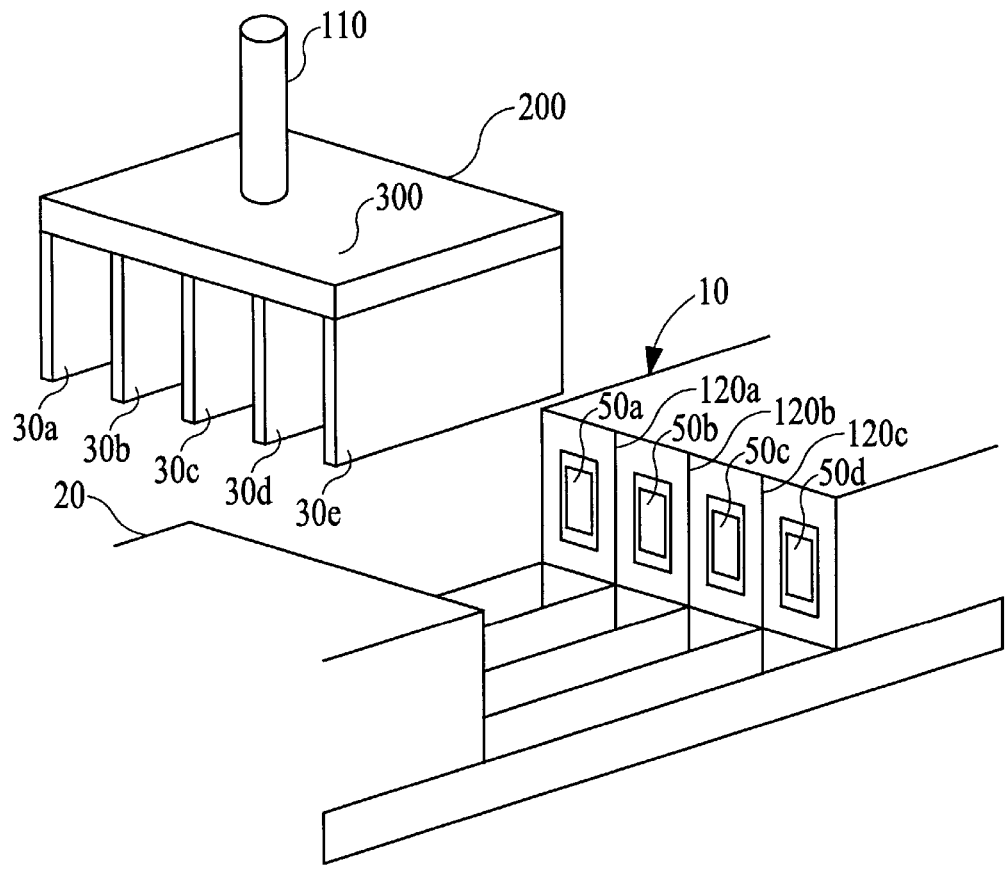
FIG. 3 is a perspective view of a moveable sorter system with the baffles retracted from the mold machine.
Figure 4:
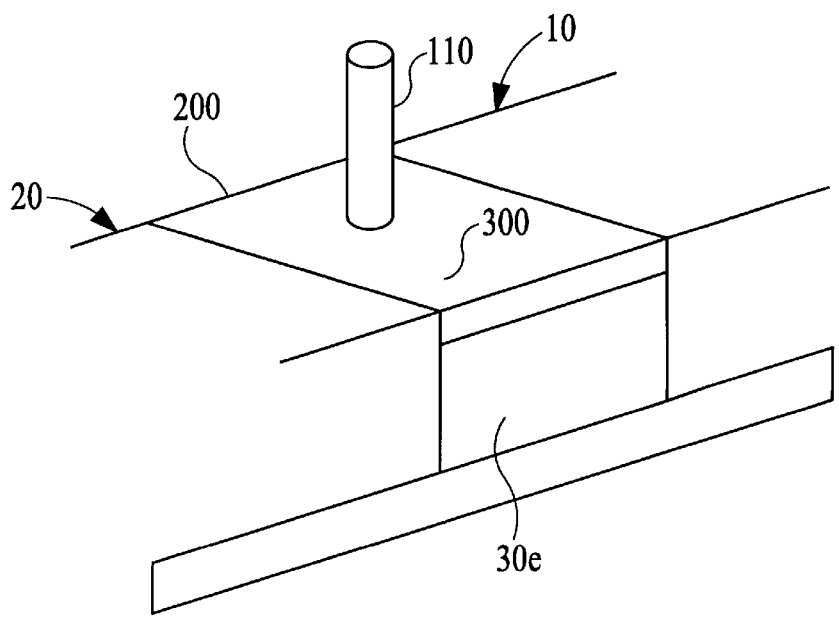
FIG. 4 is a perspective view of a moveable sorter system with the baffles positioned between the A and B plates of the mold machine.

An alternative embodiment is illustrated in FIG. 3 which comprises the A plate 10, the B plate 20, a plurality of mold cavities 50a–d and a robotically movable baffle sorter 200. The moveable sorter 200 further comprises a plurality of baffles 30a–e which correspond to the mold cavities 50a–d of the A plate 10. The baffles 30a–e are rigidly fixed perpendicular to a baffle plate 300 which is moved by a robotic arm 110. In the operation of the embodiment of FIG. 3, the A plate 10 and B plate 20 are pressed together during the normal injection process. The A plate 10 and B plate 20 then separate. As illustrated in FIG. 4, the robotic arm 110 positions the baffles 30a–e between the A plate 10 and the B plate 20 whereby the baffles keep the ejected parts from each cavity separate as they drop down for collection below the apparatus. For example, baffles 30a and 30b contain the ejection of parts from mold cavity 50a from mixing with the parts from the other cavities 50b–d.

FIG. 3 also illustrates a series of guide slots 120a–c beveled in to the face of the A plate which slideably receive the edges of the baffles 30b–d during the ejection phase. The guide slots may be fashioned to receive only the inner baffles 30b–d as illustrated, or every baffle 30a–e. The guide slots may also be beveled into the B plate face as well as the A plate face.

Accordingly, it will be understood that the preferred embodiment of the present invention has been disclosed by way of example and that other modifications and alterations may occur to those skilled in the art without departing from the scope and spirit of the appended claims.

What is claimed is:

1. A baffle sorting apparatus comprising:
   (a) An injection mold having an A plate and an opposing B plate;
   (b) A plurality of mold cavities formed the A plate and the B plate;
   (c) At least one baffle rigidly fixed and extending perpendicular to the A plate and aligned between the mold cavities;
   (d) At least one slot on the B plated fashioned to slideably receive the baffle when the A plate and B plate are pressed together;
   (e) A conveyor belt having a plurality of separated, side-walled tracks; and
   whereby material is injected into the mold cavities while the A plate and B plate are pressed together, the material is allowed to solidify, the A plate and B plate are separated, and mold products formed in the process are ejected and drop out of the plates, wherein said mold products falling from an individual mold cavity are received within said side-walled track of said conveyor belt and transported to another location.

2. The apparatus of claim 1 wherein one or more guide pins extend perpendicular to the A plate and are slideably received by one or more corresponding apertures in the B plate when both plates are pressed together.

3. The apparatus of claim 1 wherein one or more guide pins extend perpendicular to the B plate and are slideably received by one or more corresponding apertures in the A plate when both plates are pressed together.

4. The apparatus of claim 1 further comprising a plurality of collection tubes opening under the mold whereby the mold products falling from an individual mold cavity are received by the corresponding tube and transported to another location.

5. A baffle sorting apparatus comprising
   (a) An injection mold having an A plate and an opposing B plate;
   (b) A plurality of mold cavities formed the A plate and the B plate;
   (c) At least one baffle rigidly fixed and extending perpendicular to the A plate and aligned between the mold cavities;
   (d) At least one slot on the B plate fashioned to slideably receive the baffle when the A plate and B plate are pressed together;
   whereby material is injected into the mold cavities while the A plate and B plate are pressed together, the material is allowed to solidify, the A plate and B plate are separated, and mold products formed in the process are ejected and drop out of the plates, a part collection sorter receives the mold products and runner arrays of substantially different dimensions produced during the injection mold process and separates the mold products from the runner arrays by moving them over an aperture to allow the smaller object to fall through while the larger object is retained above the aperture.

6. A baffle sorting apparatus comprising
   (a) An injection mold having an A plate and an opposing B plate;
   (b) A plurality of mold cavities formed the A plate and the B plate;
   (c) At least one baffle rigidly fixed to a moveable baffle plate;
   whereby material is injected into the mold cavities while the A plate and B plate are pressed together, the material is allowed to solidify, the A plate and B plate are separated, the baffle plate is aligned between the A plate and B plate wherein at least one baffle separates two or more mold cavities, the mold products formed in the process are ejected and drop out of the plates.

7. The apparatus of claim 6 wherein the moveable baffle plate is placed between the mold plates and retracted from the mold plates by substantially vertical movement.

8. The apparatus of claim 6 wherein the moveable baffle plate is placed between the mold plates and retracted from the mold plates by substantially horizontal movement.

9. The apparatus of claim 6 further comprising shallow guide slots on at least one plate face, the guide slots aligned with and receiving an edge of the baffles during ejection of the mold products.

10. A baffle sorting apparatus comprising:
    (a) An injection mold having an A plate and an opposing B plate;
    (b) A plurality of mold cavities formed the A plate and the B plate;
    (c) At least one baffle rigidly fixed and extending perpendicular to the A plate and aligned between the mold cavities;
    (d) At least one slot on the B plated fashioned to slideably receive the baffle when the A plate and B plate are pressed together;
    (e) A part collection sorter; and
    whereby material is injected into the mold cavities while the A plate and B plate are pressed together, the material is allowed to solidify, the A plate and B plate are separated, and mold products formed in the process are ejected and drop out of the plates, wherein said mold products and runner arrays produced during the injection mold process are of substantially different dimensions to permit separation by moving both said molded products and said runner arrays over an aperture to allow the small object to fall through while the larger object is retained above the aperture.

* * * * *